United States Patent [19]

Roth et al.

[11] Patent Number: 5,284,540
[45] Date of Patent: Feb. 8, 1994

[54] METHOD OF MAKING LAMINATES FROM POLYETHYLENE FOILS AND THE LIKE

[75] Inventors: Roland Roth, Teningen-Nimburg; Henning Schick, Heitersheim, both of Fed. Rep. of Germany; Johann Bloo, Seewalchen; Franz Zacek, Vöcklabruck, both of Austria

[73] Assignees: Spohn Verpackungswerke GmbH & Co., Freiburg, Fed. Rep. of Germany; Lenzing AG, Lenzing, Austria; Spohn Verpackungswerke GmbH & Co., Freiburg, Fed. Rep. of Germany

[21] Appl. No.: 639,482

[22] Filed: Jan. 9, 1991

[30] Foreign Application Priority Data

Jan. 10, 1990 [DE] Fed. Rep. of Germany ....... 4000495

[51] Int. Cl.⁵ .................................... B29C 31/00
[52] U.S. Cl. .................................... 156/160; 156/229; 156/161; 156/163; 156/164; 428/515
[58] Field of Search ............... 156/229, 160, 163, 164, 156/161, 230; 428/515, 296

[56] References Cited

U.S. PATENT DOCUMENTS

| | | | |
|---|---|---|---|
| 2,594,229 | 4/1952 | Snyder et al. | 156/229 |
| 2,740,741 | 4/1956 | Vaughan et al. | 156/229 |
| 2,740,742 | 4/1956 | Vaughan | 156/229 |
| 2,820,733 | 1/1958 | Sorel | 156/229 |
| 3,081,212 | 3/1963 | Taylor, Jr. et al. | 156/229 |
| 3,600,250 | 8/1968 | Evans | 156/229 |
| 3,894,904 | 7/1975 | Cook | 156/229 |
| 4,652,322 | 3/1987 | Lim | 156/229 |
| 4,883,549 | 11/1989 | Frost et al. | 156/161 |
| 4,921,556 | 5/1990 | Hakiel et al. | 156/229 |
| 5,147,487 | 9/1992 | Nomura et al. | 156/229 |

FOREIGN PATENT DOCUMENTS

| | | |
|---|---|---|
| 0052262 | 5/1982 | European Pat. Off. . |
| 0122495 | 5/1989 | European Pat. Off. . |
| 1293005 | 4/1969 | Fed. Rep. of Germany . |
| 2815855 | 5/1981 | Fed. Rep. of Germany . |

OTHER PUBLICATIONS

"Erzielen spezieller Eigenschaften bei . . . ", Breitbach et al. Kunststoffe, vol. 61, 1971, H. 5), pp. 356–368.

Primary Examiner—Patrick J. Ryan
Assistant Examiner—Merrick Dixon
Attorney, Agent, or Firm—Darby & Darby

[57] ABSTRACT

An unstretched first plastic foil is laminated with a longitudinally stretched second plastic foil by the application of heat and pressure. The second foil is preheated, thereupon stretched and thereafter tempered prior to being laminated with the first foil which is heated prior to lamination. The laminating step can coincide with the tempering step and immediately follows the stretching step so that the laminating step can be carried out by utilizing heat which is required for stretching of the second foil. The material of the first foil is or can be identical with the material of the second foil; in any event, the two materials are sufficiently compatible to permit bonding of the unstretched foil to the stretched foil by the application of heat and pressure alone, i.e., without resorting to an adhesive.

8 Claims, 1 Drawing Sheet

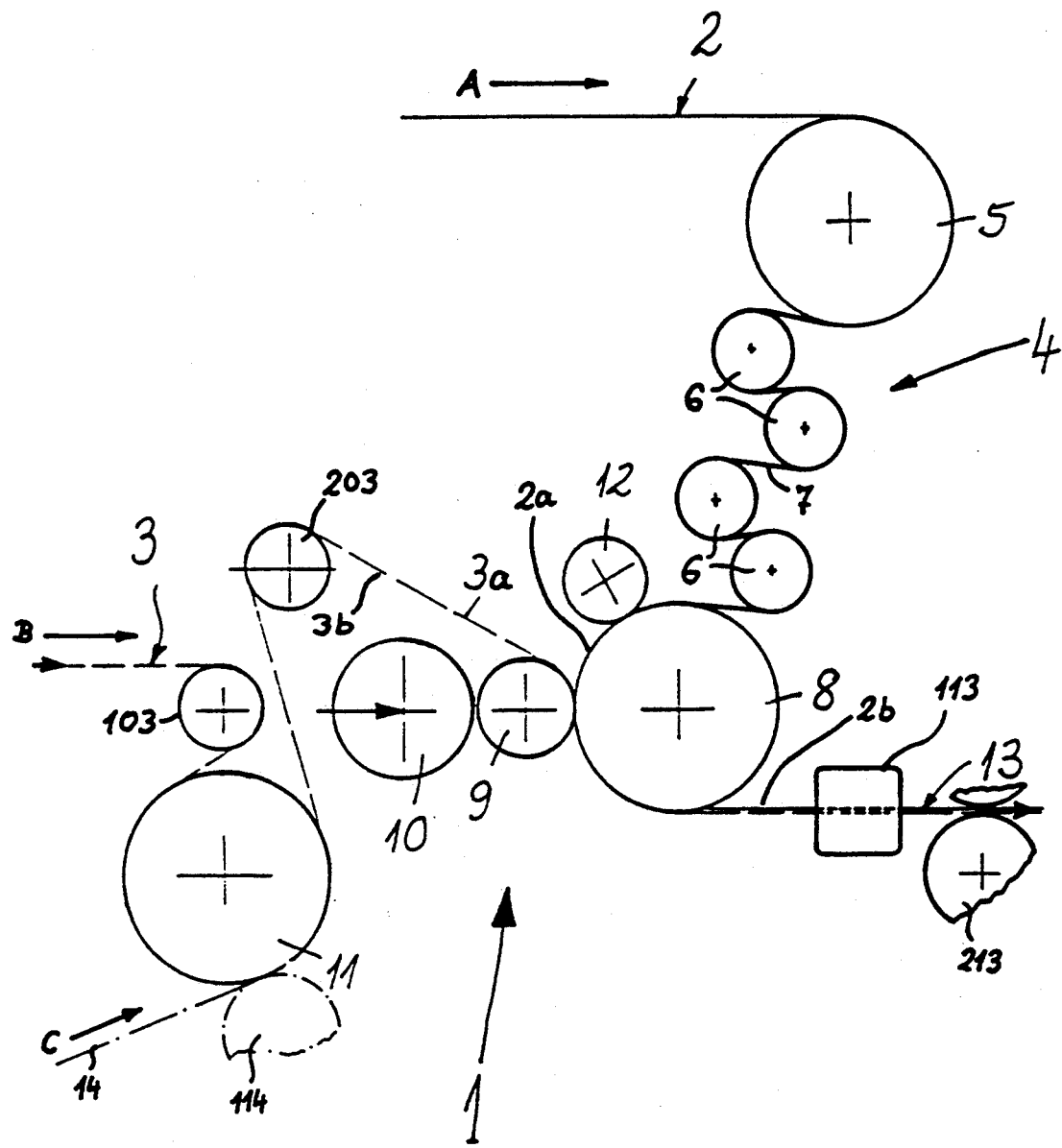

METHOD OF MAKING LAMINATES FROM POLYETHYLENE FOILS AND THE LIKE

BACKGROUND OF THE INVENTION

The invention relates to improvements in methods of and in apparatus for laminating plastic foils. The invention also relates to laminates which are obtained in accordance with the improved method and by resorting to the improved apparatus. More particularly, the invention relates to improvements in methods of and in apparatus for making laminates from stretched and unstretched plastic foils.

It is already known to make laminates wherein a longitudinally (monoaxially) stretched first foil is bonded to an unstretched second foil. The thus obtained laminate exhibits highly satisfactory strength characteristics which are attributable to the presence of the stretched foil and are effective in the direction of stretch, as well as highly satisfactory strength characteristics in a direction transversely of the laminate. Moreover, the laminate exhibits a desirable pronounced rigidity. In accordance with heretofore known proposals, a laminate which consists of or includes a stretched and an unstretched foil is obtained by resorting to an adhesive as a means for bonding the foils to each other. The temperature at which the bonding step takes place must be below the crystallite melting point of the stretched foil in order to ensure that the beneficial results of stretching at a temperature below such point are not lost in the course of the bonding operation with an adhesive.

A drawback of the just outlined conventional methods is that the adhesive contributes significantly to the cost of making the laminate. In addition, recycling of the laminate presents problems due to the presence of adhesive therein.

Attempts to overcome the drawbacks of a laminate wherein a stretched foil is bonded to an unstretched foil by means of an adhesive include extrusion of a second foil directly against one side of an unstretched foil. However, the resulting laminate does not exhibit the characteristics of a laminate which contains a stretched foil and an unstretched foil. If a layer of plastic material is extruded directly against a stretched foil, the extruding operation must be carried out at a temperature which is too high so that the part of the laminate which includes the stretched foil no longer exhibits the advantages of a stretched foil.

The article by Breitbach et al. on pages 356-368 of "Kunststoffe" (Volume 61, 1971, H. 5) describes the advantages of laminates which consist of plastic foils. The authors discuss lamination with adhesive, so-called wax lamination and so-called hot lamination. The article does not propose to make laminates which consist of or contain stretched and unstretched plastic foils.

Published European patent application No. 0 122 495 of Koebisu et al. discloses a laminated film of an olefin polymer. The product of Koebisu et al. comprises a biaxially oriented polypropylene film and at least one olefin polymer film which is laminated to at least one surface of the biaxially oriented film. The inventors propose to bond the films with an adhesive or to resort to coextrusion.

Published European patent application No. 0 052 262 of Stegmeier et al. discloses a biaxially stretched polypropylene foil at least one side of which is coated with a layer of polyethylene. The application of the polyethylene layer or layers involves coextrusion, hot lamination or fusion coating.

German Auslegeschrift No. 1 294 005 of Kahn et al. proposes that lamination of foils be followed by stretching of the resulting laminate.

German Auslegeschrift No. 28 15 855 of Buzio et al. discloses a laminate consisting of a biaxially oriented polypropylene foil and a non-oriented polypropylene foil. The two foils are bonded to each other by a layer of adhesive.

OBJECTS OF THE INVENTION

An object of the invention is to provide a novel and improved method of making laminates which consist of or contain plastic foils but need not employ any adhesive substances.

Another object of the invention is to provide a method of making a laminate which can be readily recycled.

A further object of the invention is to provide a method which can be practiced for the making of laminates exhibiting any one of a variety of desirable characteristics including pronounced resistance to longitudinal and/or transverse stretching, optimum stiffness and others.

An additional object of the invention is to provide a simple and inexpensive method of making laminates from plural plastic foils including at least one stretched foil.

Still another object of the invention is to provide a simple and inexpensive apparatus for the practice of the above outlined method.

Another object of the invention is to provide the apparatus with novel and improved means for stretching and otherwise treating at least one of several foils which are to be assembled into a laminate.

A further object of the invention is to provide an apparatus which can be rapidly converted for the making of different types of laminates.

An additional object of the invention is to provide an apparatus which can produced laminates in an economical way and satisfies the rules and regulations of authorities in charge of ecology, particularly of disposal of wrapping materials and the like.

A further object of the invention is to provide a novel and improved laminate by resorting to the above outlined method.

Another object of the invention is to provide a novel and improved laminate by utilizing the above outlined apparatus.

SUMMARY OF THE INVENTION

One feature of the present invention resides in the provision of a method of making a laminate from a plurality of foils. The method comprises the steps of introducing an unstretched first foil into and moving the first foil in a predetermined direction along an elongated first path, preheating the moving first foil in a first portion of the first path, stretching the moving preheated first foil in the predetermined direction in a second portion of the first path downstream of the first portion, moving the stretched first foil at a predetermined speed, tempering (e.g., heating) the stretched first foil in a third portion of the first path downstream of the second portion, introducing an unstretched second foil into and moving the unstretched second foil at the predetermined speed along a second elongated path which merges into the first path downstream of the second portion of the first path, pressing the first and second foils against each other in the first path in the presence of heat (e.g., in the presence of heat which is generated as a result of the stretching or tempering step), and continuously moving the thus obtained laminate along the first path.

Each of the first and second foils has a first side and a second side, and the pressing step includes urging the first sides of the first and second foils against each other. At least that layer of each of the first and second foils which is adjacent the respective first side consists of one and the same material or of two compatible materials, namely of two materials which can be bonded to each other as a result of the application of heat and pressure.

The method can further comprise the step of heating the second foil in the second path, i.e., prior to the pressing step.

Each moving step (i.e., the step of moving the first foil, the step of moving the second foil and the step of moving the laminate) preferably comprises continuously moving the respective foil and the laminate.

The pressing step can be carried out in the third portion of the first path, and the method can further comprise the step of cooling the laminate in a fourth portion of the first path downstream of the third portion.

The foils can be made, in their entirety, of one and the same plastic material, such as polyethylene or a copolymer of polyethylene.

The method can also comprise the step of maintaining the first foil in stretched condition downstream of the second portion of the first path, particularly at least during movement along and downstream of the third portion of the first path.

The pressing step preferably includes urging the first and second foils against each other in the presence of heat which matches or is only slightly less than the stretching temperature of the first foil.

Another feature of the invention resides in the provision of an apparatus for making a laminate from a stretched first foil in an unstretched second foil. The apparatus comprises means for introducing the first foil in unstretched condition into and for moving the first foil in a predetermined direction along an elongated first path, means for preheating the moving first foil in a first portion of the first path, means for stretching the preheated moving first foil in the predetermined direction in a second portion of the first path downstream of the first portion, means for tempering the stretched first foil in a third portion of the first path downstream of the second portion, means for introducing the unstretched second foil into and for moving the second foil along a second elongated path which merges into the first path downstream of the second portion of the first path, and means for pressing the stretched first foil and the unstretched second foil against each other in the first path in the presence of heat.

The preheating, stretching and tempering means can form part of the means for moving the first foil along the first path, and the tempering means can form part of the pressing means. Such tempering means can be immediately or closely adjacent the stretching means.

The apparatus can further comprise means for heating the unstretched second foil in the second path. Such heating means can comprise a roller and means for training the second foil over the roller through an angle of at least 180°, for example, through an angle of approximately 270°. Alternatively, the means for heating the second foil can comprise a plurality of rollers and means for training successive increments of the moving second foil around the rollers so that the thus trained or deformed increments of the second foil are substantially S-shaped.

The first and second foils of the laminate have abutting first sides and non-abutting second sides. The means for heating the second foil preferably includes a heating element (e.g., a roller) which contacts the first side of the second roil while the second foil moves along the second path. The pressing means can immediately follow the heating element of the means for heating the second foil so that successive increments of the first side of the second foil are contacted first by the heating element and thereupon by the first side of the first foil at the pressing station.

The apparatus can further comprise means for influencing the surface finish of the first foil between the stretching means and the pressing means. Such influencing means can comprise at least one smoothing roller which biases the first foil against the stretching means, against the tempering means and/or against the pressing means.

Still another feature of the invention resides in the provision of an elongated laminate which comprises an unstretched foil and a longitudinally stretched foil. The foils have abutting layers of identical materials or of materials which can be bonded to each other in response to the application of heat and pressure. At least one of the materials can be polyethylene or a copolymer of polyethylene.

The laminate can further comprise a third foil which adheres to one of the stretched and unstretched foils. The one foil is then disposed between the third foil and the other of the stretched and unstretched foils. It is preferred to bond the third foil to the unstretched foil.

Each of the stretched and unstretched foils can be made of polyethylene. Alternatively, each of the stretched and unstretched foils can be made of a material which is selected from the group consisting of polyethylene and copolymers of polyethylene.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The single Figure of the drawing is a schematic elevational view of an apparatus which embodies one form of the invention and can be utilized for the making of twin-layer or three-layer laminates wherein one of the layers is on its way toward the laminating station.

DESCRIPTION OF PREFERRED EMBODIMENTS

The apparatus 1 which is shown in the drawing serves to form a laminate 13 from an initially unstretched first plastic foil 2 and an unstretched second foil 3. The first foil 2 is supplied from a suitable source (e.g., a reel or an extruder) in the direction of arrow A to enter an elongated path which is defined by a plurality of rollers including a first roller 5 serving as a means for preheating the foil 2. The roller 5 moves successive (preheated) increments of the foil 2 into the range of four rollers 6 which together constitute a stretching unit 4 serving to monoaxially stretch the foil 2 on its way toward a tempering roller 8. The speed of the two lower rollers 6 exceeds the speed of the two upper rollers 6 so that successive increments of the continuously moving foil 2 are stretched at 7, i.e., close to and upstream of the tempering roller 8. The means for moving the foil 2 along its path in the direction of arrow A further comprises advancing rollers 213 which are located downstream of the tempering roller 8 and serve to draw the laminate 13 through a suitable cooling unit 113 wherein the laminate is cooled by air, by another gas or in any other suitable way.

The means for pressing the stretched foil 2 against the unstretched foil 3 comprises the tempering roller 8 and a further roller 9 which defines a portion of an elongated (second) path for the foil 3. The latter is drawn from a suitable source (e.g., a supply reel or an extruder) and is moved in the direction of arrow B on its way toward the nip of the rollers 8, 9 at the pressing or laminating station. The speed of the foil 3 matches the speed of the foil 2 downstream of the stretching unit 4, and the foil 3 is heated by a roller 11 upstream of the pressing station including the rollers 8 and 9. The roller 9 is backed up by an idler roller 10 in order to prevent uncontrolled deformation of the roller 9 as a result of the application of pressure to the foils 2 and 3 at the nip of the rollers 8 and 9.

Though the drawing shows a single preheating roller 5 for the foil 2, the latter can be preheated by two or more successive rollers and/or in any other suitable way.

A smoothing roller 12 can be provided immediately downstream of the stretching unit 4 to influence the surface or surfaces of the foil 2 ahead of the pressing or laminating station. The illustrated smoothing roller 12 cooperates with the tempering roller 8.

The rollers 9, 10 are preferably adjustable radially of the tempering roller 8. The adjusting means is not shown in the drawing. Such adjusting means is designed to cause the roller 9 to apply a force which suffices to ensure that the foils 2 and 3 are converted into the laminate 13 as a result of the application of heat and pressure during advancement of successive increments of these foils in the direction of arrow A and at the same speed.

The apparatus 1 further comprises deflecting rollers 103, 203 which flank the heating roller 11 and ensure that the continuously moving foil 3 is trained over the roller 11 along an angle of at least 180°, preferably close to 270°. If the deflecting roller 103 is heated (e.g., by the device which heats the roller 11), i.e., if the means for heating the foil 3 comprises a plurality of rotary elements, the rollers 103 and 203 cooperate to ensure that each increment of the foil 4 which is being heated by the rollers 103, 11 is caused to assume the shape of a letter S or a similar shape.

It will be noted that the roller 11 contacts that side or surface (3a) of the foil 3 which is laminated to the side or surface 2a of the foil 2 (as a result of the application of heat and pressure) during advancement through the nip of the rollers 8 and 9. Thus, the side or surface 3a of the foil 3 is not contacted by any parts during advancement of successive increments of such side or surface from the periphery of the roller 11 into engagement with the side or surface 2a of the foil 2. The just discussed mode of assembling the improved apparatus 1 is desirable and advantageous because the roller 11 can heat the foil 3 (or can complete the heating of the foil 3) ahead of the pressing or laminating station to a temperature which ensures that the temperature of those increments of the foil 3 which reach the surface 2a is best suited for the establishment of a reliable bond between the foils 2 and 3.

The smoothing roller 12 constitutes an optional but desirable and advantageous feature of the apparatus 1. This roller ensures that the freshly stretched increments of the foil 2 lie flat against the peripheral surface of the roller 8 on their way toward the pressing or laminating station which is defined by the rollers 8 and 9.

The foil 2 is or can be made of a material (e.g., polyethylene) which is preferably identical with the material of the foil 3. At the very least, that layer or stratum of the foil 3 which is adjacent the side or surface 3a is or can be made of the same material as the layer or stratum of the foil 2 which is immediately adjacent the surface 2a. However, it is also possible to make the foils 2, 3 or the aforementioned layers or strata of different materials, as long as such materials are sufficiently compatible to enable the films 2, 3 to form a laminate 13 without the need for an adhesive which would contribute to the cost of the foil 13 and would also contribute to complexity of recycling of the foil. For example, the films 2, 3 and/or their layers which are adjacent the sides 2a, 3a can be made of a material which includes polyethylene and copolymers of polyethylene.

As mentioned above, the pressing or laminating station is preferably close or very close to the stretching unit 4 so that heat which is required for the laminating step can constitute the heat or include the heat which is needed for stretching of the film 2 in the unit 4.

The apparatus 1 which is shown in the drawing can be readily converted for the making of a laminate with three layers. For example, a third foil 14 can be supplied in the direction of arrow C to be laminated to the side or surface 3b of the foil 3 so that the foil 3 is then located between the foils 2 and 14 of the thus obtained three-layer laminate. The reference character 114 denotes a combined pressing and heating roller which can cooperate with the roller 11 to bond the foil 14 to the side 3b of the foil 3. The material of the third foil 14 may but need not be the same as the material of the foil 2 and/or 3. The method of making a three-layer laminate is simplified if all three foils consist of the same material (e.g., polyethylene or a copolymer of polyethylene). Moreover, such method of making the three-layer laminate simplifies recycling of the product.

The cooling unit 113 can be of any conventional design. For example, this unit can be similar or analogous to those which are customarily employed in connection with the cooling of stretched foils.

The means (11 or 103, 11) for heating the foil 3 ahead of the pressing or laminating station (nip of the rollers 8 and 9) is optional but desirable because it contributes to the output of the apparatus 1. The arrangement is preferably such that the temperature of the foil 3 and/or 2 at the pressing or laminating station at most matches but is preferably slightly less than the stretching temperature of the foil 2. The temperature of the foil 2 in the nip of the rollers 8 and 9 can match the stretching temperature, i.e., it is not necessary to heat the foil 2 (between 4 and 9) to a temperature which is higher than the temperature of those increments of the foil 2 which have undergone or are undergoing monoaxial stretching in the unit 4.

The speed of movement of the foil 3 must match the speed of movement of the foil 2 only at the exact locus of the pressing or laminating station, i.e., in the nip of the rollers 8 and 9.

An important advantage of the improved method, apparatus and laminate is that the temperature at the laminating station is not so high that it would affect the stretched foil 2, i.e., that it would prevent the laminate 13 from exhibiting those desirable characteristics which are attributable to monoaxial stretching of one of its layers. Thus, all that is necessary is to maintain at the nip of the rollers 8, 9 a temperature which at most matches the stretching temperature for the foil 2. Another advantage of the absence of any need to heat the foils 2 and 3 to a temperature above the stretching temperature for the foil 2 is that the operation of the apparatus is economical.

An additional advantage of the improved method and apparatus is that the unstretched foil 3 is or can be heated ahead of the laminating station. This renders it possible to advance the foils at a higher speed, not only toward and through but also beyond the nip of the rollers 8 and 9.

The cooling unit 113 replaces that cooling unit which is provided downstream of the stretching station whenever a plastic foil is treated to undergo monoaxial or biaxial stretching. Thus, the number of cooling units need not be increased solely because the improved method involves the making of a laminate which consists of or includes a monoaxially stretched foil and an unstretched foil. All this can be carried out without the need for an adhesive which would contribute to complexity and cost of the method and apparatus and would complicate recycling of the laminate.

A further advantage of the improved method and apparatus is that the laminate 13 can consist of a single material, i.e., the material of the foil 2 can be identical with the material of the foil 3. This contributes to lower cost of the method, apparatus and laminate. In addition, the strength of the laminate 13 is highly satisfactory in the longitudinal direction (i.e., in the direction of stretch of the foil 2). Still further, the tendency of the laminate to splice in the transverse direction is minimal due to the presence of the unstretched foil 3. In addition, it is simpler to recycle the laminate since its constituents consist of one and the same material.

The foil 2 can remain in stretched condition downstream of the unit 4. Thus, such stretching can be maintained while the freshly stretched increments of the foil 2 are on their way toward, through and even beyond the nip of the rollers 8 and 9. Maintaining the foil 2 in stretched condition at the laminating station ensures that the desirable effects of stretching in the unit 4 are not affected or lost in the course of the laminating step.

The laminating station can accommodate more than two rollers; for example, the means for urging the unstretched foil 3 against the stretched foil 2 (while the latter overlies the tempering roller 8) can comprise the roller 9 and at least one roller downstream of the roller 9.

The exact construction of the stretching unit 4 forms no part of the present invention. This unit can be any conventional unit wherein a moving plastic foil can be monoaxially stretched as a result of the application of heat and a stretching or tensioning force. The tempering roller 8 not only forms part of the pressing means but can further serve to maintain the temperature of the foil 2 at an optimum value in the region of the nip of the rollers 8, 9 as well as to assist the two lower rollers 6 to stretch successive increments of the foil 2 in the gap 7 between the upper rollers 6 and the lower rollers 6.

The simplicity of the improved apparatus 1 is attributable in part to the fact that such apparatus can be assembled of simple, compact and inexpensive components. Thus, a conventional stretching unit 4 and a conventional cooling unit 113 can be used in conjunction with a small number of rollers (5, 6, 12, 8 and 213) to define a path for and to move the foil 2 in the direction of arrow A toward, through and beyond the laminating station. The construction of that part of the apparatus which defines the path for the foil 3 is even simpler because the foil 3 need not be stretched ahead of the laminating station.

As mentioned above, the smoothing roller 12 is an optional feature of the improved apparatus. This roller contributes significantly to the quality of the laminate 13 in that it expels bubbles of entrapped gaseous fluid and/or other defects before the respective increments of the stretched foil 2 reach the laminating station.

The ratio of stretch of the foil 2 during treatment in the unit 4 can be between 1:1.5 and 1:10. If the foil 2 is made of polyethylene, the stretching temperature which is slightly below the crystallite melting temperature. The roller 9 can have an outer envelope of rubber or a like material which bears upon the side or surface 3b of the foil 3 at the laminating station. The axial length of the roller 9 can match the width of the foils 2, 3 or the width of the wider of these foils. The crystallite melting point of the foil 3 at the laminating station is lower than that of the foil 2; this results in the establishment of a desirable strong bond between the two foils. The method is economical because heat which is needed to ensure proper stretching in the unit 4 can be utilized to maintain the stretched foil 2 at an optimum temperature during bonding to the foil 3. The laminating operation can be carried out at a high speed, especially if the foil 3 is preheated.

It is further within the purview of the invention to affix a second unstretched foil 3 to the side or surface 2b of the stretched foil 2. Such laminating step can be carried out upstream or downstream of the roller 8.

EXAMPLE

The foil 2 was advanced toward the preheating roller 5 at a speed of 10 m/min. This foil had a thickness of 0.180 mm and consisted of high-density polyethylene (HDPE GF7740). The preheating roller 5 was maintained at a temperature of 110° C., the topmost roller 6 of the stretching unit 4 was maintained at a temperature of 122° C., the next three rollers 6 were maintained at a temperature of 126° C., and the tempering roller 8 was maintained at a temperature of 128° C. The stretching action of the unit 4 was such that the thickness of the foil 2 was reduced from 0.180 mm to 0.03 mm and the speed of the foil 2 was increased from 10 m/min. to 60 m/min. (the same as the speed of the laminate 13).

The foil 3 was delivered at a speed of 60 m/min. and had a thickness of 0.025 mm. This foil consisted of low density polyethylene (LDPE 2420H) and the roller 11 was maintained at a temperature of 60° C. The roller 10 was caused to apply to the roller 9 (and hence to the foils 2, 3 in the nip of the rollers 8 and 9) a pressure in the range of 3–5 bar. The laminate 13 had a thickness of 0.055 mm. The high-density polyethylene foil 2 can be replaced with linear low density polyethylene (LLDPE 2740) or with a copolymer of polyethylene with octene, butene or methylpentene (4-methylpentene-1). The low-density polyethylene foil 3 can be replaced with a copolymer of polyethylene with vinyl acetate, n-butyl acrylate or ethylene acrylic acid.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of making a laminate from a plurality of foils, comprising the steps of introducing an unstretched first foil into and moving the first foil in a predetermined direction along a first path; preheating the moving foil in a first portion of said path; stretching the moving foil in said direction in the presence of heat in a second portion of said path downstream of said first portion; moving the stretched foil at a predetermined speed; tempering the stretched foil in a third portion of said path downstream of said second portion; introducing an unstretched second foil into and moving the second foil at said predetermined speed along a second path which merges into said first path downstream of said second portion, said foils consisting of a material which is selected from the group consisting of polyethylene and copolymers of polyethylene and each having a top and a bottom surface; heating the unstretched second foil along said second path upstream of where said second path merges with said first path; pressing the stretched first and the unstretched second foils against each other in the first path in the presence of heat which is applied prior to said stretching step and in the absence of an adhesive; maintaining one of said surfaces of said unstretched second foil free of contact with any machine parts between said heating and pressing steps; and continuously moving the resulting laminate along said first path.

2. The method of claim 1, wherein each of the first and second foils has a first side and a second side, said pressing step including urging the first sides of the first and second foils against each other, each of the first and second foils having a layer adjacent the respective first side and said layers consisting of identical or compatible materials so that said layers are bonded to each other as a result of the application of heat and pressure.

3. The method of claim 1, further comprising the step of heating the second foil in said second path prior to said pressing step.

4. The method of claim 1, wherein each of said moving steps comprises continuously moving the respective foil and the laminate.

5. The method of claim 1, wherein said pressing step is carried out in the third portion of said first path and further comprising the step of cooling the laminate in fourth portion of said first path downstream of said third portion.

6. The method of claim 1, further comprising the step of maintaining the first foil in stretched condition downstream of the second portion of said first path.

7. The method of claim 1, further comprising the step of maintaining the first foil in stretched condition during movement along and downstream of the third portion of said first path.

8. The method of claim 1, wherein said pressing step includes pressing the first and second foils against each other in the presence of heat which matches or is slightly less than the stretching temperature of the first foil.

* * * * *